(12) United States Patent
Milhas

(10) Patent No.: US 6,933,028 B2
(45) Date of Patent: Aug. 23, 2005

(54) FIRE-RESISTANT FUEL TRANSPORT PIPE

(75) Inventor: Pierre Milhas, Vitry-le-Francois (FR)

(73) Assignee: Nobel Plastiques (FR)

( * ) Notice: Subject to any disclaimer, the term of this patent is extended or adjusted under 35 U.S.C. 154(b) by 130 days.

(21) Appl. No.: 10/204,187

(22) PCT Filed: Feb. 20, 2001

(86) PCT No.: PCT/FR01/00489

§ 371 (c)(1),
(2), (4) Date: Aug. 19, 2002

(87) PCT Pub. No.: WO01/65162

PCT Pub. Date: Sep. 7, 2001

(65) Prior Publication Data

US 2003/0012908 A1 Jan. 16, 2003

(30) Foreign Application Priority Data

Feb. 25, 2000 (FR) .............................. 00 02405

(51) Int. Cl.$^7$ .................. F16L 9/12; F16L 11/15;
B32B 3/28; E04C 2/32; C09K 21/00
(52) U.S. Cl. ................ 428/36.91; 428/36.6; 428/321.1;
428/321.5; 428/446; 428/448; 428/451;
428/518; 428/920; 428/921; 428/182; 138/121;
138/122; 138/148; 138/173; 52/783.13;
252/601; 252/606; 252/610
(58) Field of Search .............................. 428/36.6, 36.91,
428/321.1, 321.5, 446, 448, 451, 518, 920,
921, 182–186; 138/121, 122, 148, 173;
52/783.13; 252/601–611

(56) References Cited

U.S. PATENT DOCUMENTS

| | | | | | |
|---|---|---|---|---|---|
| 4,113,667 A | * | 9/1978 | Mori et al. | ................ | 521/163 |
| 4,509,559 A | * | 4/1985 | Cheetham et al. | .......... | 138/121 |
| 4,543,281 A | * | 9/1985 | Pedersen et al. | ............ | 138/148 |
| 4,569,878 A | * | 2/1986 | Barrall et al. | ............... | 428/182 |
| 5,057,367 A | * | 10/1991 | Morii et al. | ................ | 428/389 |
| 5,182,049 A | * | 1/1993 | von Bonin | .............. | 252/378 R |
| 5,413,828 A | * | 5/1995 | De Keyser | ................ | 428/36.5 |
| 6,110,559 A | * | 8/2000 | De Keyser | .................. | 428/68 |
| 6,429,246 B1 | * | 8/2002 | Rous | ......................... | 524/268 |
| 6,516,126 B1 | * | 2/2003 | Rous et al. | ................. | 385/128 |

FOREIGN PATENT DOCUMENTS

| | | | | |
|---|---|---|---|---|
| DE | 195 04 616 | | 8/1996 | |
| EP | 0 010 751 | | 5/1980 | |
| FR | 2 698 153 | | 5/1994 | |
| FR | 2747175 A | * | 10/1997 | ............ F16L/11/20 |
| GB | 2 306 605 | | 5/1997 | |

OTHER PUBLICATIONS

Translation of FR 2,747,175.*

* cited by examiner

Primary Examiner—Harold Pyon
Assistant Examiner—Chris Bruenjes
(74) Attorney, Agent, or Firm—Dykema Gossett PLLC

(57) ABSTRACT

A plastics material tube that is particularly resistant to fire, such that its wall is formed by a corrugated tube of flammable plastics material, by a smooth tube lining the outside of the corrugated tube and made of a plastics material that limits flame propagation, and by a fireproofing composition received between the two tubes.

9 Claims, 1 Drawing Sheet

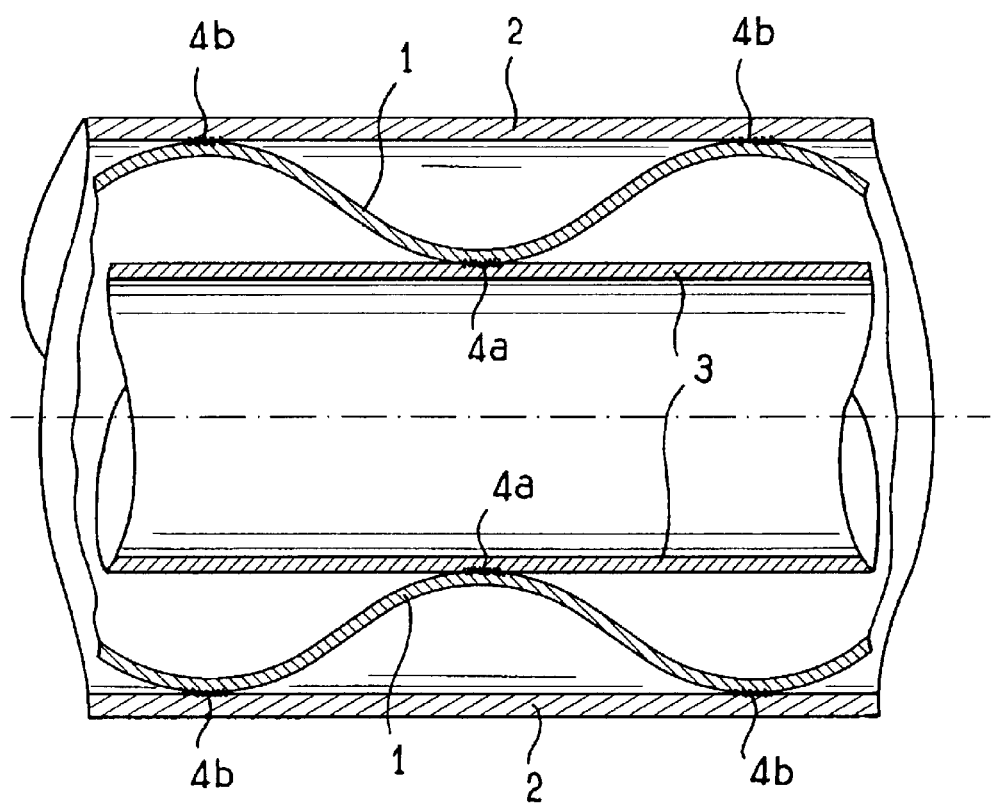

FIRE-RESISTANT FUEL TRANSPORT PIPE

The present invention relates to a fire-resistant tube structure made of plastics material and intended mainly for the automobile industry, and in this context to act as a fuel tank filler spout.

There exist two techniques for fireproofing ducts made of plastics material which by nature is flammable. The first consists in selecting the material that forms the wall of the pipe from fluorine-containing polymers or compounds having a flame-retarding filler. Intrinsically fire-resistant material such as a fluorine-containing polymer is very expensive, being three to eight times more expensive than the base material used for making parts of this type. As for compounds that contain flame-retarding fillers, such compounds do not have adequate mechanical and leakproofing properties for the intended application in car manufacture, specifically because of the filler.

Multi-layer tubes have been envisaged in which the outer layer is made of a fire-resistant material, i.e. a material capable of protecting the inner material, while the inner material is adapted to constitute a barrier to the liquid, i.e. the vehicle fuel, but to present little resistance to fire. This second layer which is intimately bonded with the first layer is expensive and does not present mechanical properties that are sufficiently advantageous for it to be suitable for making a motor vehicle fuel pipe.

The present invention seeks to provide a different solution to the problem of protecting a fuel tube, and in particular a fuel tank filler tube.

To this end, the plastics material tube of the invention is such that its wall is formed by a corrugated tube of flammable plastics material, by a smooth tube of plastics material that limits flame propagation, and by a fireproofing composition received between the two tubes.

It is appropriate to give a few definitions concerning fire for the materials used in fuel tubes. Thus, a flame-resistant material is a material which enables a test piece to conserve its characteristics during a given length of time when in contact with a calibrated flame. A fire-resistant material is a material which enables the test piece to conserve its characteristics for a given length of time while the assembly is immersed in a controlled fire. Finally, a material that does not propagate flame is a material in which combustion takes place in such a manner that flame propagation does not take place beyond those zones which are directly in contact therewith.

The structure of the invention is such that by using relatively low-cost materials such as fireproofing materials and materials that do not propagate flame, such as polyvinylchloride, a tube is obtained in low-cost manner that is capable of withstanding fire for more than 80 seconds in the standardized tests used by motor manufacturers.

To prevent the tube with a corrugated inside surface from coming into contact with the fuel, since a large area is harmful to performance in terms of permeability, and since corrugations would generate noise by encouraging turbulent flow and thus give off fuel vapor specifically because of the turbulence, the wall of the tube of the invention may include a smooth tube of plastics material lining the inside of the corrugated tube.

The fireproofing material inserted in the gaps defined between the corrugated tube and the outer tube may be in the form of a powder, in the form of a viscous oil, or in the form of a curable liquid that thus becomes solid. In addition to its qualities of inertness with respect to fire, it may include various components serving to add qualities of intumescence, i.e. of forming a kind of foam which develops a hardening skin facing any flame so as to form a shield that delays propagation of heat towards the inside of the tube.

The wall structure of the tube of the invention is shown in the sole FIGURE.

In the FIGURE it can be seen that the wall comprises a corrugated tube 1 lined on the outside by a smooth tube 2 and on the inside by another smooth tube 3. There exist coextrusion machines which are capable of producing such structures continuously. Under such circumstances, all three tubes are connected together via the inner and outer peaks 4a and 4b of the corrugations in the corrugated tube. Filler material can also be put into place between the corrugated tube and the outer tube by using such a machine, thus making it possible specifically to insert a substance continuously between the corrugated tube and at least one of the smooth tubes.

Other methods of manufacture could be envisaged in which the three tubes constituting the wall of the tube of the invention are made separately. Under such circumstances, the three tubes are slid one into another as a pre-fabricating step and they are secured to one another, e.g. at their ends by means of heat sealing or adhesive. The material which is interposed between the corrugated tube and the smooth outer tube can be put into place prior to inserting the tube 1 in the tube 2 by filling the outside waves of the tube 1 prior to sliding it into the tube 2, with the waves being filled by any means that are appropriate given the nature of the fireproof substance.

The tube 1 and/or the tube 2 are made of a material that possesses good barrier properties against the fuel; such a material may be constituted by a polyamide, a compound based on polyamide, a high density polyethylene, or a polyamide-polyethylene alloy, all of which substances are substances that catch fire quickly. The outer layer 2 is made of a flame-retardant material, i.e. conventionally a polyvinylchloride. The fireproofing material, if it is in powder form, can be any inorganic material, generally a metallic hydroxide salt, combined with a greater or lesser quantity of talc for reasons of cost. If it is a liquid composition, its major component should be a silicone oil known for having the quality of being intrinsically fire-resistant. This component may be associated with various additives giving it their specific properties, such as organic fireproofing substances in the liquid phase and/or compounds that perform an intumescence function such as ammonium polyphosphates and/or inorganic fillers in powder form and/or cross-linking agents and/or barrier agents that present ceramic properties under the effect of heat, such as the substance sold by the supplier Bruner Mond and known under the trade name CEEPREE.

EXAMPLES

A powder fireproofing material suitable for use is constituted by a mixture of 60% by weight magnesium hydroxide or aluminum hydroxide and 40% by weight of talc from Luzernac. One possible way of applying such a powder to fill the outside waves of the tube 1 at least in part is to use electrostatic spraying.

A fireproofing substance in the liquid phase comprises 40% by weight silicone oil (e.g. the substance available from the supplier Rhone Poulenc under the trade name RHODORSIL), 25% by weight ammonium polyphosphate which constitutes a compound having intumescent properties when heat is applied thereto, plus 5% by weight of pentaerythritol which constitutes the additive needed to make it effective, 5% melamine which is another additive needed to make intumescent substances effective, and 25% by weight talc, this mineral filler encouraging intumescence of the preceding substances by generating precursors.

More generally such a liquid fireproofing composition comprises by weight 40% to 60% fire-resistant oil, 15% to 25% ammonium polyphosphate, 5% to 10% one or more compounds for activating ammonium polyphosphate, and 10% to 25% mineral filler such as talc.

The liquid compound is intended to become solid under the effect of a cross-linking agent. Thus the fire-resistant oil is a curable silicone oil and the above-described composition includes 5% by weight of a curing agent for such oils.

Finally, the fireproofing substance may be in vitreous form, i.e. in the form of a composition comprising at most 20% liquid in the form of silicone oil, with the remainder being constituted by fillers or intumescent compositions.

In a first example, the composition is constituted by weight by 20% RHODORSIL silicone oil, 60% aluminum or magnesium metallic salt hydroxide, 5% antimony, and 15% talc.

In another example, with fractions expressed in terms of percentage of the weight of the total mixture, the 20% silicone oil are combined with 40% of the ceramic property substance known as CEEPREE, 20% magnesium hydroxide, 12% ammonium polyphosphate (intumescent substance) together with its pentaerythritol and melamine activators comprising 3% each, and 2% antimony.

Working a viscous type substance is analogous to working an adhesive using a pump and an applicator die within the corrugations of the corrugated tube 1.

What is claimed is:

1. A fire resistant plastic tube comprising:
    a corrugated tube (1) of flammable plastics material having regularly spaced apart corrugations with maximum radii and minimum radii,
    a first smooth tube (2) lining the outside of the corrugated tube and made of a plastics material that limits flame propagation, the first smooth tube fixed to the corrugated tube at each of the maximum radii of the corrugations, and
    a fireproofing composition filling the gaps defined between the corrugated tube and the first smooth tube.

2. A tube according to claim 1, further comprising a second smooth tube (3) of plastics material lining and attached to the inside of the corrugated tube.

3. A tube according to claim 2, wherein the plastics material of the first smooth tube is polyvinylchloride.

4. A tube according to claim 1, wherein the fireproofing composition is in the form of a powder mixture.

5. A tube according to claim 4, wherein the powder mixture comprises 30% to 60% by weight metallic salt hydroxide and 70% to 30% by weight talc.

6. A structure according to claim 5, wherein the fireproofing substance includes an intumescent compound of ammonium polyphosphate.

7. A structure according to claim 1, wherein the fireproofing compounds comprise by weight 60% to 80% a fire-resistant oil filled with a powder mixture including an intumescent ammonium polyphosphate compound.

8. A tube according to claim 1, wherein the fireproofing composition is in liquid form and comprises by weight 40% to 60% fire-resistant oil, 15% to 25% ammonium polyphosphate, 5% to 10% of at least one compound for activating ammonium polyphosphate, and 10% to 25% talc.

9. A tube according to claim 8, wherein the oil is a curable silicone oil and wherein the fireproofing composition includes a curing agent constituting 5% by weight.

* * * * *